2,898,191
PROCESS FOR PREPARING ZINC OXIDE

John B. Conn and William Karl Humphrey, Westfield, N.J., assignors to Merck & Co., Inc., Rahway, N.J., a corporation of New Jersey No Drawing. Application January 2, 1953
Serial No. 329,473

1 Claim. (Cl. 23—147)

This invention relates to the preparation of metal oxides. More particularly, it is concerned with the preparation of a new form of zinc oxide.

It is known that zinc oxide can be reacted with ferric oxide in solid solution at about 1000° C. to produce zinc ferrite, a spinel which has been useful in the radio and electronic industries where magnets having high permeability and low eddy values are required. However, the magnetic quality of the resulting product has varied considerably largely because of incomplete reaction between the oxides. One prerequisite, of course, to successful reactions in solid solution is that the reactants be intimately mixed and in abundant contact with each other. This can only be achieved by utilizing reactive material of the smallest particle size obtainable. It was found, however, that the finest ordinary white zinc oxide of commerce had a particle size above 1000 A. which was undesirably large. Attempts to reduce the size by known means were unsuccessful. Therefore, it was necessary to employ this relatively large size zinc oxide in the preparation of zinc ferrite and other similar substances. However, it was very unsatisfactory because, with it, a complete or uniform reaction was difficult to achieve.

Therefore, one object of this invention is to provide zinc oxide of exceedingly small particle size. A further object is to provide a highly reactive form of zinc oxide. Another object is to provide a new form of zinc oxide possessing a buff-red color. An additional object is to provide a practical process for the preparation of this new form of zinc oxide. Other objects will be apparent from the detailed description hereinafter provided.

In accordance with this invention, it is now found that a new form of zinc oxide of extremely small and uniform particle size is produced by heating ammoniated zinc carbonate at temperatures within the range of about 100–400° C. This new form of zinc oxide is distinguished by its buff-red color and is particularly characterized by its submicroscopic particle size. Thus, this product is eminently well suited for the manufacture of zinc ferrite as well as for other purposes where an extremely fine sized form of zinc oxide is required.

In our process the ammoniated zinc carbonate is decomposed by the heating to remove ammonia and carbon dioxide and form the desired zinc oxide. A temperature in excess of 100° C. is required to decompose the ammoniated zinc carbonate and produce zinc oxide. When the ammoniated zinc oxide is heated at temperatures in excess of about 400° C. the zinc oxide loses its buff-red color and in addition progressively increases in particle size. Therefore, it is desirable to employ temperatures lower than about 400° C. in carrying out the process of our invention.

The time of heating required to produce the new form of zinc oxide varies inversely with the temperature. Thus, the reaction is completed in a matter of minutes at temperatures above about 350° C., and below about 400° C., while heating below 200° C. requires hours and even days to release all of the ammonia and carbon dioxide. The preferred conditions for producing our novel form of zinc oxide comprise heating ammoniated zinc carbonate at 250° C. for about 1–2 hours or until all of the ammonia and carbon dioxide are released. At this point, a weight loss of about 43% will be realized and the resulting product will have the particle size of about 100–200 A.

It is desirable to agitate the ammoniated zinc carbonate while heating to facilitate the removal of ammonia and carbon dioxide. In addition, agitation prevents localized over-heating and produces a uniform temperature throughout the material which aids in obtaining an exceedingly small uniformly sized particle. Alternatively, however, this agitation is not necessary when the material is heated in a very thin layer.

This new form of zinc oxide is, in part, characterized by its unique submicroscopic particle size. Thus, it has a substantially uniform particle size of about 100–300 A as determined by X-ray diffraction measurements and electron micrographs. However, the zinc oxide of this invention is not merely ordinary white zinc oxide of reduced particle size, but rather is an entirely new form. Besides the ultra-fine particle size possessed by this new form of zinc oxide it is further identified and distinguished by a buff-red color. While the color might be believed to be due to an impurity, such has not been found to be the case, as the color exists in the absence of all determinable amounts of impurities. The product is also characterized by being highly hygroscopic. For example, it will absorb 4–5% of water upon standing in air for a few minutes at ordinary humidity. If mixed with water this new form of zinc oxide sets to a coherent cake upon drying. Nevertheless, the product is very stable under otherwise ordinary conditions.

The ammoniated zinc carbonate used as a starting material in our process is readily prepared by adding either ordinary zinc carbonate to ammonia water, or alternatively, adding zinc oxide to ammonia water containing ammonium carbonate. However, it is preferred to start with zinc oxide since zinc carbonate is not as readily obtainable. Ammoniated zinc carbonate is easily precipitated from the reaction mixture by lowering the ammonia content. This may be achieved by a number of common methods such as saturating the reaction mixture with carbon dioxide under pressure, passing air into the solution to remove ammonia by entrainment, driving off ammonia by heating, or reducing the pressure over the reaction mixture. It is preferred, however, to effect precipitation of the ammoniated zinc carbonate by saturating the reaction mixture with carbon dioxide. After precipitation, the ammoniated zinc carbonate is recovered and either dried below 100° C. and stored for later use, or converted directly to the new form of zinc oxide by heating it at 100–400° C. without an initial drying.

Although the amount of each reactant employed in preparing ammoniated zinc carbonate is not critical, it is best to run the reaction at high concentrations for economy. However, the amount of zinc carbonate which dissolves or stays in solution is dependent on the amount of ammonia present. Therefore, concentrated ammonia water (28%) is employed since it is commercially available. In the process comprising adding zinc oxide to an aqueous solution of ammonia-ammonium carbonate, high production of the desired product is obtained with a minimum of effort and time when the reaction mixture is prepared to contain about 28% ammonia, about 20% ammonium carbonate and 20–25% ordinary white zinc oxide. Although this ratio may be altered considerably without substantial harm the ammonium carbonate should preferably be above 10% to aid in ammoniation of the zinc carbonate.

The example which follows is presented as illustrative of the methods employed in accordance with our invention to obtain the new form of zinc oxide.

Example

To a solution of 800 gm. of commercial ammonium carbonate in 4 liters of 28% ammonia water is added gradually 880 gm. of commercial white zinc oxide with stirring at room temperature. A small amount of zinc oxide remains undissolved. The mixture is then filtered to remove the undissolved excess and insoluble impurities. Carbon dioxide is blown into the filtered solution under pressure at 8 to 10 liters per minute until no further separation of solid occurs. The ammoniated zinc carbonate is collected on a filter, washed thoroughly with deionized water, and dried below 100° C.

The ammoniated zinc carbonate is then heated in an oven at 250° C. with agitation until the weight loss is 43%, which requires 1–2 hours. The resulting zinc oxide is buff-red and a very mobile bulky powder. It has a particle size below 300 A.

The particle size of representative batches of the new form of zinc oxide was determined by X-ray diffraction according to the method reported in the book "Chemical Crystallography" by C. W. Bunn, Oxford Press, 1945, pp. 362–367. The results of these determinations are shown in the following table along with the X-ray diffraction pattern of ordinary zinc oxide having a particle size in excess of 1000 A.

The particle size was calculated by using the Von Laue equation:

$$t = \frac{1.42\lambda \sec \theta}{B-b}$$

wherein $t$=particle size in A.
$\lambda$=wave length of X-ray in A. (CuK$\alpha_1\alpha_2$)
$\theta$=Bragg angle of reflection
$B$=peak width at half height of sample to be measured
$b$=peak width at half height of any sample of identical composition having a particle size greater than 1000 A. (here ordinary ZnO)

Various changes and modifications in the procedure herein described may occur to those skilled in the art, and to the extent that such changes and modifications fall within the purview of the appended claim, it is to be understood that they constitute part of our invention.

What is claimed is:

The process of making a special form of zinc oxide comprising mixing white zinc oxide with ammonia water containing ammonium carbonate dissolved therein until the zinc oxide is dissolved, introducing carbon dioxide gas to the reaction mixture to remove ammonia and precipitate a reaction product, removing the precipitate from the mixture, heating the precipitate within the range of 100–400° C. to release ammonia and carbon dioxide therefrom until the weight loss reaches about 43%, and thereupon discontinuing the heating and recovering the resulting product, which is a hygroscopic, mobile and bulky buff-read powder having a particle size below 300 A.

| Bragg Angle in Degrees | Ordinary White ZnO Particles above 1,000 A. | | Buff-red ZnO, Sample A | | | Buff-red ZnO, Sample B | | |
|---|---|---|---|---|---|---|---|---|
| | Intensity (in arbitrary units) | Peak width at ½ peak height in degrees | Intensity (in arbitrary units) | Peak width at ½ peak height in degrees | Particle size in A. | Intensity (in arbitrary units) | Peak width at ½ peak height in degrees | Particle size in A. |
| 15.98 | 5.50 | 0.37 | 1.08 | 1.41 | 120 | 1.28 | 0.98 | 210 |
| 17.30 | 3.54 | 0.32 | 1.10 | not determinable. | | 1.24 | not determinable. | |
| 18.40 | 7.00 | 0.32 | 1.32 | 2.02 | 75 | 1.78 | 1.32 | 130 |
| 23.85 | 1.86 | 0.32 | Too small to measure. | | | Too small to measure. | | |
| 28.33 | 3.10 | 0.35 | 0.52 | 1.06 | 193 | 1.72 | 0.86 | 278 |

References Cited in the file of this patent

UNITED STATES PATENTS

| | | |
|---|---|---|
| 654,804 | Rigg | July 31, 1900 |
| 1,204,843 | Bretherton | Nov. 14, 1916 |
| 1,579,302 | Gidden | Apr. 6, 1926 |
| 1,854,664 | Ogden | Apr. 19, 1932 |
| 1,956,585 | Oglesby et al. | May 1, 1934 |
| 2,348,883 | Cyr | May 16, 1944 |
| 2,372,367 | De Pew | Mar. 27, 1945 |

OTHER REFERENCES

Ehret et al.: "Red Zinc Oxide," in "Journal of the American Chemical Society," May 1943, vol. 65, pages 872 to 877 inclusive.

J. W. Mellor's "A Comprehensive Treatise on Inorganic and Theoretical Chemistry," vol. 4, page 647, Longmans, Green and Co., New York.